Nov. 24, 1970 K. H. SENNOWITZ 3,542,989
SHORT CIRCUIT PROTECTION SYSTEM FOR ELECTRICAL DISCHARGE MACHINING APPARATUS
Filed Jan. 22, 1968
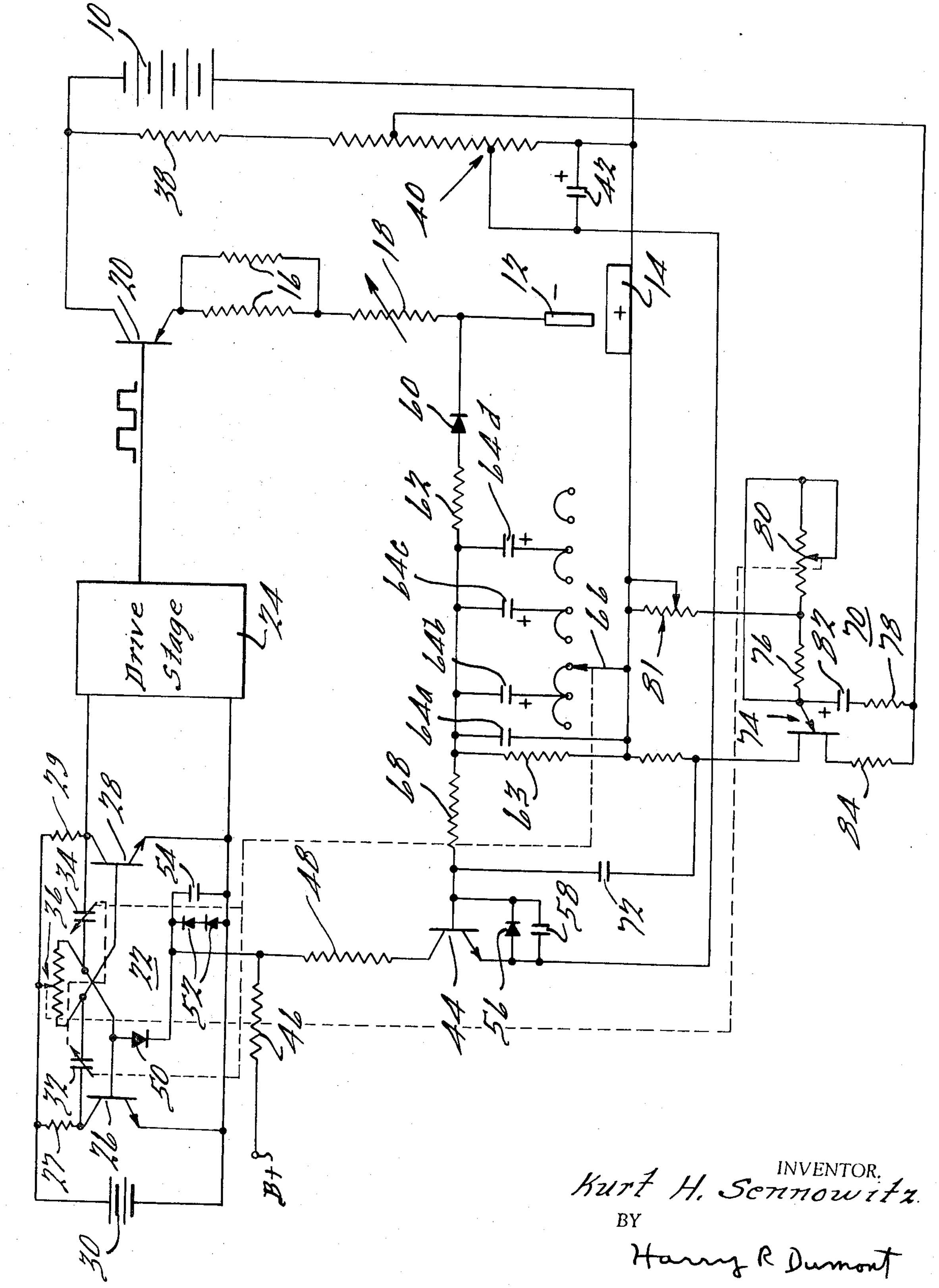
INVENTOR.
Kurt H. Sennowitz
BY
Harry R Dumont
ATTORNEY.

3,542,989
Patented Nov. 24, 1970

3,542,989

SHORT CIRCUIT PROTECTION SYSTEM FOR ELECTRICAL DISCHARGE MACHINING APPARATUS

Kurt H. Sennowitz, Royal Oak, Mich., assignor to Elox Inc., Troy, Mich., a corporation of Delaware Continuation-in-part of application Ser. No. 531,856, Mar. 4, 1966, now Patent No. 3,439,145. This application Jan. 22, 1968, Ser. No. 699,418
Int. Cl. B23p *1/08*
U.S. Cl. 219—69 7 Claims

ABSTRACT OF THE DISCLOSURE

A control system for selectively reducing current to an electrical discharge machining gap in response to short-circuit gap conditions. A pulsing means of variable frequency controls an electronic switch connected between a DC power source and the gap. A network of variable time constant senses gap short circuits and responsively interrupts operation of the pulsing means. A control means gangs the pulsing means and the sensing network for inversely varying the frequency of the pulsing means and the time constant of the sensing network.

CROSS REFERENCE TO RELATED APPLICATION

This application is a continuation-in-part of my copending application No. 531,856 filed on Mar. 4, 1966, now Pat. No. 3,439,145, issued Apr. 15, 1969, and entitled "Electrical Discharge Machining Power Supply Circuit," said application being of common ownership herewith.

BRIEF SUMMARY OF THE INVENTION

In electrical discharge machining, sometimes hereinafter called EDM, it is necessary to protect the workpiece and electrode from damage due to gap short circuit condition. I have found it desirable to continue the pulsing of the gap during continued short circuit but at precisely controlled frequencies and on-off times. I have further found it advantageous to provide a response time for the protective system which is related to the frequency at which EDM is being carried out.

DESCRIPTION OF THE DRAWING

The figure of the drawing is a schematic circuit diagram.

The drawing shows the basic elements of an electrical discharge machining power supply. The main machining DC source 10 is connected across the machining gap including electrode 12 and workpiece 14. A flow of dielectric coolant is maintained through the gap as material is being removed from the workpiece. Resistors 16 and 18 are connected between the output of the electronic switch, i.e., transistor 20, and electrode 12. Resistor 18 is of adjustable magnitude for control of the magnitude of machining current. A pulser, multivibrator 22 is used to provide variable on-off time, variable frequency pulses to operate transistor 20. One or more drive stages 24 may be included between multivibrator 22 and transistor 20. While my invention is shown in connection with a transistorized EDM power supply, it is not so limited but may be employed in any supply where an electronic switch or bank of parallel connected switches is connected between a DC power source and the machining gap and periodically triggered into operation. By "electronic switch" I mean any electronic control device having three or more electrodes comprising at least two power electrodes acting to control current flow in the power circuit, the conductivity of the power circuit being controlled by a control electrode within the switch whereby the conductivity of the power circuit is controlled statically or electrically without movement of any mechanical elements within the switch. Included within this definition are vacuum tubes, transistors and the like.

Multivibrator 22 is of the astable type and includes a pair of transistors 26, 28 biased and connected for alternate operation. Bias source 30 provides drive voltage. Load resistors 27 and 29 are connected to the collectors of transistors 26, 28 as indicated. Transistors 26 and 28 have their respective bases and collectors cross-coupled as shown through a pair of resistor-capacitor networks. Capacitors 32, 34 are variable to control the frequency of operation of the multivibrator. In the interest of simplifying the disclosure, capacitors 32, 34 are shown as variable capacitors. In actual commercial power supplies, these are incorporated in the form of a plurality of tap capacitor switches. Potentiometer 36 is connected as a common return potentiometer. Through the movement of its slider, it is possible to increase the resistance in one transistor resistor-capacitor network and to correspondingly decrease the resistance in the other transistor resistor-capacitor network. The relative on-off times of transistors 26, 28 can then be changed without altering the frequency that has been already preset through capacitors 32, 34. This type of circuit provides EDM over a broad range of frequencies and pulse on-off times.

The reference voltage for my protection circuit is derived from the main machining power supply 10 through resistor 38 and potentiometer 40 with filter capacitor 42 connected as shown. The cut-off switch comprises transistor 44 connected to a B+ voltage through resistors 46 and 48. Diode 50 isolates the base of transistor 26 so that operation of the multivibrator continues during open circuit or normal cutting operation. Diodes 52 and filter capacitor 54 clamp the cut-off voltage to the multivibrator ground. Transistor 44 has its base-to-emitter junction protected from excess turn-off voltage through diode 56. Capacitor 58 is included to filter out stray pick-up signals and prevent premature triggering of transistor 44. A sensing network is connected between the base of transistor 44 and the machining gap. It is the function of this network to provide an output signal representative of gap spacing. Included in the sensing network are diode 60, series limiting resistor 62, resistor 63 and a plurality of capacitors 64*a*, *b*, *c*, *d*, with associated tap switch 66. The capacitance present in the sensing network and the response time constant is variable according to the setting of switch 66. As the contact of switch 66 is moved rightwardly, the capacitance present in the network is decreased so that faster cut-off response is provided. Tap switch 66 is preferably operated in tandem with that tap switch controlling the multivibrator capacitance, i.e., the magnitude of capacitors 32, 34. In this manner, as the machining frequency is preset and increased, for example, the proper response time of the cut-off switch 44 for the higher frequency is automatically set. Transistor 44 remains open so long as the gap voltage sensed is more minus than the reference voltage preset by potentiometer 40. Drive limiting resistor 68 is in series with the base of transistor 44.

A free-running oscillator 70 is used to pulse transistor 44 at a predetermined rate to operate it during a prolonged gap short circuit condition. The pulse output from oscillator 70 is passed through coupling capacitor 72. The pulser for cut-off switch 44 may be any of a number of pulsers known to the electronic art. In the present embodiment of my invention, unijunction transistor 74 is employed with its on-off time controlled through an associated RC network including resistors 76, 78, the variable resistance rheostat 80, 81 and capacitor 82. The frequency of the pulser may be adjusted by the setting of rheostate 81. Unijunction transistor 74 is further connected to its supply voltage. Thus voltage is derived from main supply 10 through resistor 84 and a second contact on potentiometer 40. A second resistor is connected between the plus terminal of supply 10 and unijunction transistor 74. Rheostat 80 is operated in tandem with multivibrator potentiometer 36 so that the pulse output of oscillaor 70 is of the desired pulse width during minimum and maximum multivibrator on-time. This insures the best possible combination of cutting efficiency and arc protection.

DESCRIPTION OF OPERATION

Before operation of the power supply, the reference voltage for the system is preset by potentiometer 40. The gap voltage is sensed by a sensing network coupled across the gap. This sensing network responds to the peak voltage existing across the gap and provides a control signal which is a function of the peak voltage to the base of cut-off transistor 44 to control its conduction. The time constant of the sensing network is selectively preset by tap switch 66. When the multivibrator 22 frequency is in the low range, switch 66 will be in its left-hand position to connect a relatively large magnitude capacitor in the network such as capacitor **64*b*. As the multivibrator frequency is increased by adjustment of capacitors 32, 34 such as for a finishing operation, a smaller capacitor will be switched in through the ganged operation of capacitor top switch 66** in the sensing network.

As previously indicated, the cut-off switch 44 is maintained in its "off" state during normal cutting operation or gap open circuit. It will remain open so long as the gap voltage is more negative than the preset reference voltage. If the gap voltage goes more positive than the reference voltage, transistor 44 will be turned on. In its conductive state, it will then turn off transistor 26 and hold off multivibrator 22. In the absence of the second pulser-oscillator 70, transistor 44 would stay on and maintain the multivibrator off until the gap voltage swings more negative than hte reference voltage. During that period, the gap current would fall to zero which condition would not be desirable while cutting a deep hole. In addition, the power feed would back up all the way in response to absence of gap current after a short to open the gap. I have found that the continued application of pulses to the gap during the continued short circuit condition is of distinct advantage in clearing the short uircuit from the gap. The effect of oscillator 70 is to pulse the base of transistor 44 by passing thereto a negative square wave pulse through coupling capacitor 72. The oscillator 70 frequency may be preset to operate at from several c.p.s. to several thousand c.p.s. Each time a pulse is applied to the base of transistor 44, it is turned off for a turn-off period determined by the pulse width preset through the RC network associated with unijunction transistor 74. During each of the aforesaid turn-off periods, multivibrator 22 will be free to operate in a normal fashion to provide pulses to the gap. My short circuit protection circuit has further advantage in being fail safe in its operation. Should the oscillator 70 stop pulsing, the short circuit current would reach zero and multivibrator 22 would stop cut-off until the short circuit opens. Should transistor 44 short emitter to collector, it would also cut off the multivibrator and protect the electrodes during a shorted arc.

I claim:

1. In an apparatus for machining a conductive workpiece by electrical discharge across a dielectric coolant filled gap between a tool electrode and the workpiece, a power source, an electronic switching means having a control electrode and a pair of power electrodes, said power electrodes connected between said source and the gap, means operatively connected to said control electrode of said switching means for pulsing it with variable frequency, variable on-off time pulses to provide machining power pulses to the gap, a sensing means connected to said gap for providing a signal output responsive to abnormal gap characteristic, an electronic cut-off switch operatively connected between said sensing means and said pulsing means for interrupting its operation responsive to said output, a second pulser means for providing variable duration pulses to the control electrode of said cut-off switch, said sensing means having a selectively variable resistor-capacitor network, said first pulsing means comprising a multivibrator including a pair of electronic switches coupled for alternate operation through a variable resistor-capacitor network, and a means included for conjointly varying the capacitance in said resistor-capacitor network of said sensing means conjointly with that of said multivibrator whereby the response time of said sensing means is varied in a manner inversely proportional to multivibrator frequency.

2. The combination as set forth in claim 1 wherein said second pulser means comprises a unijunction oscillator, said unijunction oscillator having a variable resistor-capacitor network for controlling its frequency of operation and on-off time, and means for varying the resistance in said last mentioned network and conjointly varying the resistance in said multivibrator resistor-capacitor network.

3. In an apparatus for machining a conductive workpiece by electrical discharge across a dielectric coolant filled gap between a tool electrode and the workpiece, a power source, an electronic switch having a control electrode and a pair of power electrodes, said power electrodes connected between said source and said gap, a multivibrator for pulsing said switch, said multivibrator including a pair of electronic switches coupled for alternate operation through a variable resistor-capacitor network, said capacitor variable to control multivibrator frequency, a cut-off switch for interrupting the operation of said multivibrator responsive to gap short circuit condition, said cut-off switch comprising a cut-off transistor having one of its power electrodes operatively connected to and controlling one of said multivibrator switches, and the other power electrode connected to a reference voltage, said transistor having its control electrode coupled to said gap through a sensing network, said sensing network including a capacitor coupled across said gap through a diode, said capacitor selectively variable to control its response time, and means for varying conjointly the capacitance of said sensing network in relationship to the capacitance of said multivibrator network, said last mentioned means operable to increase the response time of said sensing means responsive to decrease in frequency of said multivibrator and operable to decrease the response time of said sensing means responsive to increase in frequency of said multivibrator.

4. The combination as set forth in claim 3 wherein a second pulsing means is coupled to said cut-off transistor for turning it on and off at a predetermined frequency substantially lower than the frequency of operation of said multivibrator.

5. In an apparatus for machining a conductive workpiece by electrical discharge across a dielectric coolant filled gap between a tool electrode and the workpiece, a power source, an electronic switching means having a control electrode and a pair of power electrodes, said power electrodes connected between said source and the gap, pulsing means of variable frequency operatively connected to said control electrode of said switching means for pulsing it on and off to provide machining power pulses to said gap, a sensing network of variable time constant of operation operatively connected to said gap for providing a signal output responsive to abnormal gap characteristic, an electronic cut-off switch operatively connected between said sensing means and said pulsing means for interrupting its operation responsive to said output, and a control means conjointly operable with and controlling said pulsing means and said sensing means for selectively varying the frequency of operation of said pulsing means and inversely varying the time constant of said sensing means.

6. The combination as set forth in claim 5 wherein a different resistor-capacitor network is connected to both said pulsing means and said sensing means, for controlling their respective frequencies and time constants of operation and wherein said control means comprises a ganged capacitor switching device therefor.

7. The combination as set forth in claim 6 wherein said sensing network includes the series combination of a diode, resistor and capacitor, said combination connected across said gap for responding substantially to peak voltages existing thereacross.

References Cited

UNITED STATES PATENTS 2,951,969 9/1960 Matulaitis et al. ------- 219—69

RALPH F. STAUBLY, Primary Examiner